(12) United States Patent
Kim et al.

(10) Patent No.: US 12,713,393 B2
(45) Date of Patent: Aug. 18, 2026

(54) DISPLAY DEVICE AND SYSTEM

(71) Applicant: LG ELECTRONICS INC., Seoul (KR)

(72) Inventors: Taeyoung Kim, Seoul (KR); Seonil Yu, Seoul (KR); Sanghun Kim, Seoul (KR); Donghee Han, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 331 days.

(21) Appl. No.: 18/269,280

(22) PCT Filed: Dec. 23, 2020

(86) PCT No.: PCT/KR2020/018962

§ 371 (c)(1),
(2) Date: Jun. 22, 2023

(87) PCT Pub. No.: WO2022/139028

PCT Pub. Date: Jun. 30, 2022

(65) Prior Publication Data

US 2024/0137604 A1 Apr. 25, 2024
US 2024/0236407 A9 Jul. 11, 2024

(51) Int. Cl.
*H04W 68/00* (2009.01)
*H04L 9/40* (2022.01)
(Continued)

(52) U.S. Cl.
CPC ....... *H04W 68/005* (2013.01); *H04L 63/0876* (2013.01); *H04N 21/43637* (2013.01); *H04W 12/55* (2021.01)

(58) Field of Classification Search
CPC ................ H04W 68/005; H04W 12/55; H04L 63/0876; H04N 21/43637; H04N 21/4367; H04N 21/4122; H01R 2107/00
See application file for complete search history.

(56) References Cited

U.S. PATENT DOCUMENTS 8,346,168 B2 * 1/2013 Chae ................ H04M 1/72412 455/41.3
2010/0022187 A1 * 1/2010 Ohkita ............. H04W 52/0261 455/41.2

(Continued)

FOREIGN PATENT DOCUMENTS

JP 5873495 3/2016
KR 1020060027084 3/2006

(Continued)

OTHER PUBLICATIONS

PCT International Application No. PCT/KR2020/018962, International Search Report dated Sep. 23, 2021, 4 pages.

*Primary Examiner* — Md K Talukder
(74) *Attorney, Agent, or Firm* — LEE, HONG, DEGERMAN, KANG & WAIMEY

(57) ABSTRACT

A display device according to an embodiment of the present disclosure, comprising a display, a wireless communication interface for Bluetooth connection with a wireless device and a control unit configured to: in a state where a Bluetooth connection is established with the wireless device, receive a device switching request requesting a Bluetooth connection to another display device is received, transmit a first Bluetooth information of the display device the other display device according to the received device switching request, and disconnect the Bluetooth connection with the wireless device.

13 Claims, 11 Drawing Sheets

(51) Int. Cl.

| | |
|---|---|
| ***H04N 21/4363*** | (2011.01) |
| ***H04W 12/55*** | (2021.01) |

(56) References Cited

U.S. PATENT DOCUMENTS

| | | | | |
|---|---|---|---|---|
| 2012/0302170 | A1* | 11/2012 | Frazier | H04W 84/20 455/41.3 |
| 2013/0252557 | A1* | 9/2013 | Hillyard | H04W 4/80 455/41.2 |
| 2014/0342670 | A1* | 11/2014 | Kang | H04L 69/14 455/67.11 |
| 2015/0044970 | A1* | 2/2015 | Park | H04W 76/14 455/41.2 |
| 2016/0105924 | A1* | 4/2016 | Baek | H04W 76/15 455/41.2 |
| 2017/0280275 | A1* | 9/2017 | Nagao | H04W 4/80 |
| 2020/0008057 | A1* | 1/2020 | Zhao | H04L 9/0869 |
| 2020/0128620 | A1* | 4/2020 | Han | H04W 4/20 |
| 2023/0299806 | A1* | 9/2023 | Hao | H04B 1/385 455/569.1 |
| 2024/0137604 | A1* | 4/2024 | Kim | H04N 21/43637 |
| 2024/0146996 | A1* | 5/2024 | Shao | H04N 21/4122 |

FOREIGN PATENT DOCUMENTS

| | | |
|---|---|---|
| KR | 101668394 | 10/2016 |
| KR | 101907075 | 10/2018 |
| KR | 1020180125358 | 11/2018 |
| KR | 1020200044505 | 4/2020 |
| KR | 1020200098253 | 8/2020 |

* cited by examiner

Figure 1:
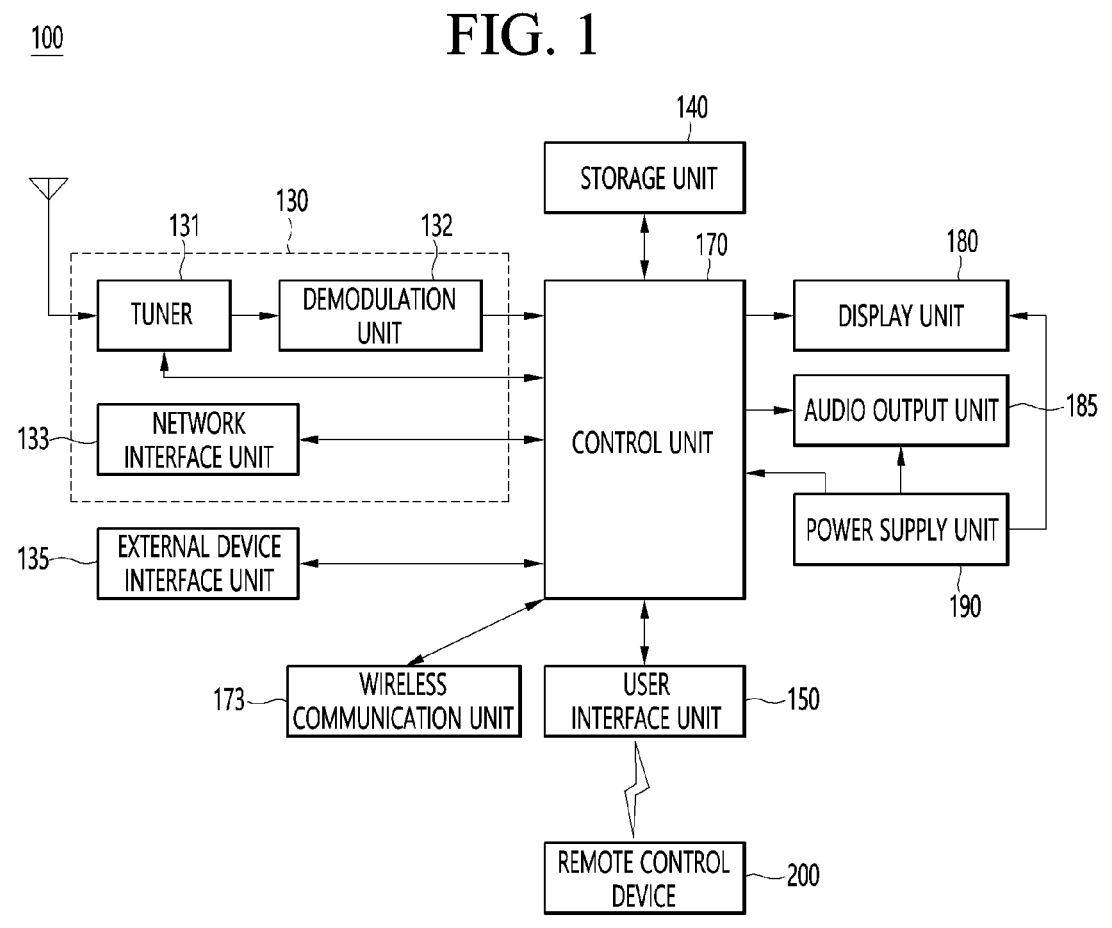

140
STORAGE UNIT 130
131
TUNER
132
DEMODULATION UNIT
133
NETWORK INTERFACE UNIT

170
CONTROL UNIT

180
DISPLAY UNIT
185
AUDIO OUTPUT UNIT
POWER SUPPLY UNIT
190

135
EXTERNAL DEVICE INTERFACE UNIT

173
WIRELESS COMMUNICATION UNIT
USER INTERFACE UNIT
150

REMOTE CONTROL DEVICE
200

100
900
180
Device List
910
1. TV2
930
2. wireless keyboard

FIG. 12

DISPLAY DEVICE AND SYSTEM

CROSS-REFERENCE TO RELATED APPLICATIONS

This application is the National Stage filing under 35 U.S.C. 371 of International Application No. PCT/KR2020/018962, filed on Dec. 23, 2020, the contents of which are all incorporated by reference herein in their entireties.

TECHNICAL FIELD

The present disclosure relates to a display device for Bluetooth connection.

BACKGROUND ART

Digital TV services using wired or wireless communication networks are becoming common. Digital TV services are capable of providing various services that could not be provided by the existing analog broadcasting services.

For example, IPTV (Internet Protocol Television), a type of digital TV service, and smart TV service provide bi-directionality that allows users to actively select the type of program to watch and the viewing time. IPTV and smart TV services may provide various additional services, such as Internet search, home shopping, and online games, based on this interactive nature.

In addition, recent TV can output data received from external device through Bluetooth communication.

For Bluetooth connection, the user checks and selects the device list searched by the device on the screen of the device and proceeds with a pairing process.

However, the process of registering a new device is inconvenient for the user to perform input several times.

DISCLOSURE

Technical Problem

The present disclosure is to solve the inconvenience of registering a Bluetooth connection if a Bluetooth connection is made with a new device.

The present disclosure is to enhance usability between Bluetooth devices by switching Bluetooth information.

Technical Solution

A display device according to an embodiment of the present disclosure, comprising a display, a wireless communication interface for Bluetooth connection with a wireless device and a control unit configured to: in a state where a Bluetooth connection is established with the wireless device, receive a device switching request requesting a Bluetooth connection to another display device is received, transmit a first Bluetooth information of the display device the other display device according to the received device switching request, and disconnect the Bluetooth connection with the wireless device.

A system according to an embodiment of the present disclosure, comprising a wireless device and a display device configured to: in a state where a Bluetooth connection is established with the wireless device, receive a device switching request requesting a Bluetooth connection to another display device is received, transmit a first Bluetooth information of the display device the other display device according to the received device switching request, and disconnect the Bluetooth connection with the wireless device, wherein the wireless device performs a Bluetooth connection with the other display device based on the first Bluetooth information.

Advantageous Effects

According to various embodiments of the present disclosure, a Bluetooth registration process for a new device becomes unnecessary, and convenience can be greatly improved.

According to various embodiments of the present disclosure, a user can quickly switch a currently Bluetooth-connected device to another device with only a simple user input.

DESCRIPTION OF DRAWINGS

FIG. 1 is a block diagram illustrating a configuration of a display device according to an embodiment of the present disclosure.

FIG. 9 is a diagram illustrating a process of selecting a device to switch Bluetooth pairing through an interface screen displayed on a first display device according to another embodiment of the present disclosure.

FIG. 12 is a diagram illustrating a process of switching a connection between devices according to a device switching request if a plurality of wireless devices are connected to a first display device through Bluetooth, according to an embodiment of the present disclosure.

BEST MODE

Figure 2:
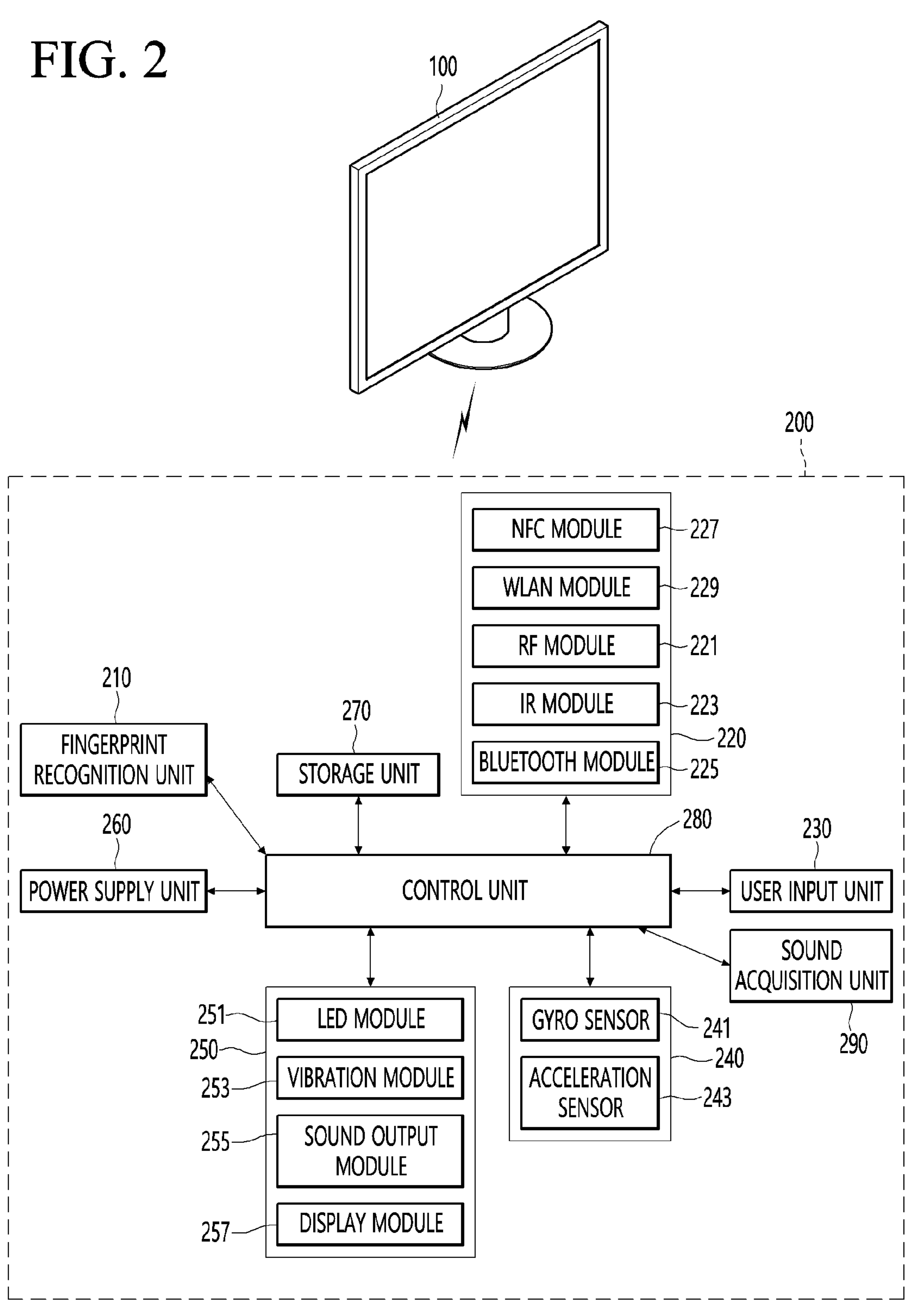
FIG. 2 is a block diagram illustrating a remote control device according to an embodiment of the present invention.

Hereinafter, embodiments relating to the present disclosure will be described in detail with reference to the drawings. The suffixes "module" and "unit" for components used in the description below are assigned or mixed in consideration of easiness in writing the specification and do not have distinctive meanings or roles by themselves.

A display device according to an embodiment of the present invention, for example, as an artificial display device that adds a computer supporting function to a broadcast receiving function, can have an easy-to-use interface such as a writing input device, a touch screen, or a spatial remote control device as an Internet function is added while fulfilling the broadcast receiving function. Then, with the support of a wired or wireless Internet function, it is possible to perform an e-mail, web browsing, banking, or game function in access to Internet and computers. In order to perform such various functions, standardized general purpose OS can be used.

Accordingly, since various applications are freely added or deleted on a general purpose OS kernel, a display device described herein, for example, can perform various user-friendly functions. The display device, in more detail, can be a network TV, Hybrid Broadcast Broadband TV (HBBTV), smart TV, light-emitting diode (LED) TV, organic light-emitting diode (OLED) TV, and so on and in some cases, can be applied to a smartphone.

FIG. 1 is a block diagram illustrating a configuration of a display device according to an embodiment of the present invention.

Referring to FIG. 1, a display device 100 can include a broadcast reception unit 130, an external device interface unit 135, a storage unit 140, a user interface unit 150, a control unit 170, a wireless communication unit 173, a display unit 180, an audio output unit 185, and a power supply unit 190.

The broadcast reception unit 130 can include a tuner 131, a demodulation unit 132, and a network interface unit 133.

The tuner 131 can select a specific broadcast channel according to a channel selection command. The tuner 131 can receive broadcast signals for the selected specific broadcast channel.

The demodulation unit 132 can divide the received broadcast signals into video signals, audio signals, and broadcast program related data signals and restore the divided video signals, audio signals, and data signals to an output available form.

The external device interface unit 135 can receive an application or an application list in an adjacent external device and deliver it to the control unit 170 or the storage unit 140.

The external device interface unit 135 can provide a connection path between the display device 100 and an external device. The external device interface unit 135 can receive at least one an image or audio output from an external device that is wirelessly or wiredly connected to the display device 100 and deliver it to the control unit 170. The external device interface unit 135 can include a plurality of external input terminals. The plurality of external input terminals can include an RGB terminal, at least one High Definition Multimedia Interface (HDMI) terminal, and a component terminal.

An image signal of an external device input through the external device interface unit 135 can be output through the display unit 180. A sound signal of an external device input through the external device interface unit 135 can be output through the audio output unit 185.

An external device connectable to the external device interface unit 135 can be one of a set-top box, a Blu-ray player, a DVD player, a game console, a sound bar, a smartphone, a PC, a USB Memory, and a home theater system, but this is just exemplary.

The network interface unit 133 can provide an interface for connecting the display device 100 to a wired/wireless network including the Internet network. The network interface unit 133 can transmit or receive data to or from another user or another electronic device through an accessed network or another network linked to the accessed network.

Additionally, some content data stored in the display device 100 can be transmitted to a user or an electronic device, which is selected from other users or other electronic devices pre-registered in the display device 100.

The network interface unit 133 can access a predetermined webpage through an accessed network or another network linked to the accessed network. That is, the network interface unit 133 can transmit or receive data to or from a corresponding server by accessing a predetermined webpage through the network.

Then, the network interface unit 133 can receive contents or data provided from a content provider or a network operator. That is, the network interface unit 133 can receive contents such as movies, advertisements, games, VODs, and broadcast signals, which are provided from a content provider or a network provider, through network and information relating thereto.

Additionally, the network interface unit 133 can receive firmware update information and update files provided from a network operator and transmit data to an Internet or content provider or a network operator.

The network interface unit 133 can select and receive a desired application among applications open to the air, through network.

The storage unit 140 can store signal-processed image, voice, or data signals stored by a program in order for each signal processing and control in the control unit 170.

Additionally, the storage unit 140 can perform a function for temporarily storing image, voice, or data signals output from the external device interface unit 135 or the network interface unit 133 and can store information on a predetermined image through a channel memory function.

The storage unit 140 can store an application or an application list input from the external device interface unit 135 or the network interface unit 133.

The display device 100 can play content files (for example, video files, still image files, music files, document files, application files, and so on) stored in the storage unit 140 and provide them to a user.

The user interface unit 150 can deliver signals input by a user to the control unit 170 or deliver signals from the control unit 170 to a user. For example, the user interface unit 150 can receive or process control signals such as power on/off, channel selection, and screen setting from the remote control device 200 or transmit control signals from the control unit 170 to the remote control device 200 according to various communication methods such as Bluetooth, Ultra Wideband (WB), ZigBee, Wireless Frequency (RF), and IR.

Additionally, the user interface unit 150 can deliver, to the control unit 170, control signals input from local keys (not shown) such as a power key, a channel key, a volume key, and a setting key.

Image signals that are image-processed in the control unit 170 can be input to the display unit 180 and displayed as an image corresponding to corresponding image signals. Additionally, image signals that are image-processed in the control unit 170 can be input to an external output device through the external device interface unit 135.

Voice signals processed in the control unit 170 can be output to the audio output unit 185. Additionally, voice signals processed in the control unit 170 can be input to an external output device through the external device interface unit 135.

Besides that, the control unit 170 can control overall operations in the display device 100. Additionally, the control unit 170 can control the display device 100 by a user command or internal program input through the user interface unit 150 and download a desired application or application list into the display device 100 in access to network.

The control unit 170 can output channel information selected by a user together with processed image or voice signals through the display unit 180 or the audio output unit 185.

Additionally, according to an external device image playback command received through the user interface unit 150, the control unit 170 can output image signals or voice signals of an external device such as a camera or a camcorder, which are input through the external device interface unit 135, through the display unit 180 or the audio output unit 185.

Moreover, the control unit 170 can control the display unit 180 to display images and control broadcast images input through the tuner 131, external input images input through the external device interface unit 135, images input through the network interface unit, or images stored in the storage unit 140 to be displayed on the display unit 180. In this case, an image displayed on the display unit 180 can be a still image or video and also can be a 2D image or a 3D image.

Additionally, the control unit 170 can play content stored in the display device 100, received broadcast content, and external input content input from the outside, and the content can be in various formats such as broadcast images, external input images, audio files, still images, accessed web screens, and document files.

Moreover, the wireless communication unit 173 can perform a wired or wireless communication with an external electronic device. The wireless communication unit 173 can perform short-range communication with an external device. For this, the wireless communication unit 173 can support short-range communication by using at least one of Bluetooth™, Wireless Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication unit 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication unit 173 can detect (or recognize) a communicable wearable device around the display device 100. Furthermore, if the detected wearable device is a device authenticated to communicate with the display device 100, the control unit 170 can transmit at least part of data processed in the display device 100 to the wearable device through the wireless communication unit 173. Accordingly, a user of the wearable device can use the data processed in the display device 100 through the wearable device.

The display unit 180 can convert image signals, data signals, or on-screen display (OSD) signals, which are processed in the control unit 170, or images signals or data signals, which are received in the external device interface unit 135, into R, G, and B signals to generate driving signals.

Furthermore, the display device 100 shown in FIG. 1 is just one embodiment of the present invention and thus, some of the components shown can be integrated, added, or omitted according to the specification of the actually implemented display device 100.

That is, if necessary, two or more components can be integrated into one component or one component can be divided into two or more components and configured. Additionally, a function performed by each block is to describe an embodiment of the present invention and its specific operation or device does not limit the scope of the present invention.

According to another embodiment of the present invention, unlike FIG. 1, the display device 100 can receive images through the network interface unit 133 or the external device interface unit 135 and play them without including the tuner 131 and the demodulation unit 132.

For example, the display device 100 can be divided into an image processing device such as a set-top box for receiving broadcast signals or contents according to various network services and a content playback device for playing contents input from the image processing device.

In this case, an operating method of a display device according to an embodiment of the present invention described below can be performed by one of the display device described with reference to FIG. 1, an image processing device such as the separated set-top box, and a content playback device including the display unit 180 and the audio output unit 185.

Figure 3:
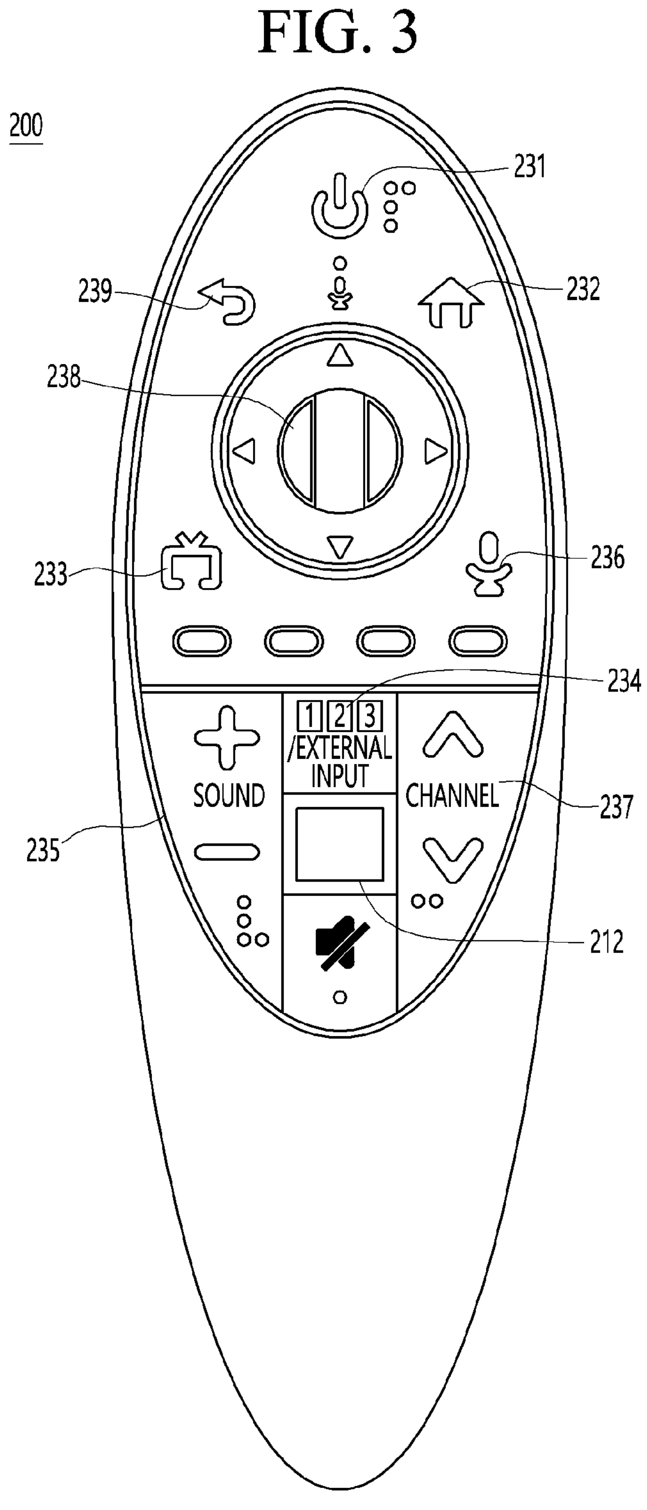
FIG. 3 is a view illustrating an actual configuration of a remote control device according to an embodiment of the present invention.

Then, referring to FIGS. 2 and 3, a remote control device is described according to an embodiment of the present invention.

FIG. 2 is a block diagram illustrating a remote control device according to an embodiment of the present invention and FIG. 3 is a view illustrating an actual configuration of a remote control device according to an embodiment of the present invention.

First, referring to FIG. 2, a remote control device 200 can include a fingerprint recognition unit 210, a wireless communication unit 220, a user input unit 230, a sensor unit 240, an output unit 250, a power supply unit 260, a storage unit 270, a control unit 280, and a sound acquisition unit 290.

Referring to FIG. 2, the wireless communication unit 220 transmits/receives signals to/from an arbitrary any one of display devices according to the above-mentioned embodiments of the present invention.

The remote control device 200 can include a wireless frequency (RF) module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include a Near Field Communication (NFC) module 227 for transmitting/receiving signals to/from the display device 100 according to the NFC communication standards and a WLAN module 229 for transmitting/receiving signals to/from the display device 100 according to the Wireless LAN (WLAN) communication standards.

Additionally, the remote control device 200 can transmit signals containing information on a movement of the remote control device 200 to the display device 100 through the wireless communication unit 220.

Moreover, the remote control device 200 can receive signals transmitted from the display device 100 through the RF module 221 and if necessary, can transmit a command on power on/off, channel change, and volume change to the display device 100 through the IR module 223.

The user input unit 230 can be configured with a keypad button, a touch pad, or a touch screen. A user can manipulate the user input unit 230 to input a command relating to the display device 100 to the remote control device 200. If the user input unit 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present invention, the fingerprint recognition button 212 can perform a push operation and receive a push operation and a fingerprint recognition operation. The power button 231 can be button for turning on/off the power of the display device 100. The home button 232 can be a button for moving to the home screen of the display device 100. The live button 233 can be a button for displaying live broadcast programs. The external input button 234 can be a button for receiving an external input connected to the display device 100. The voice adjustment button 235 can be a button for adjusting the size of a volume output from the display device 100. The voice recognition button 236 can be a button for receiving user's voice and recognizing the received voice. The channel change button 237 can be a button for receiving broadcast signals of a specific broadcast channel. The check button 238 can be a button for selecting a specific function and the back button 239 can be a button for returning to a previous screen.

Again, referring to FIG. 2, if the user input unit 230 includes a touch screen, a user can touch a soft key of the touch screen to input a command relating to the display device 100 to the remote control device 200. Additionally, the user input unit 230 can include various kinds of input means manipulated by a user, for example, a scroll key and a jog key, and this embodiment does not limit the scope of the present invention.

The sensor unit 240 can include a gyro sensor 241 or an acceleration sensor 243 and the gyro sensor 241 can sense information on a movement of the remote control device 200.

For example, the gyro sensor 241 can sense information on an operation of the remote control device 200 on the basis of x, y, and z axes and the acceleration sensor 243 can sense information on a movement speed of the remote control device 200. Moreover, the remote control device 200 can further include a distance measurement sensor and sense a distance with respect to the display unit 180 of the display device 100.

The output unit 250 can output image or voice signals in response to manipulation of the user input unit 230 or image or voice signals corresponding to signals transmitted from the display device 100. A user can recognize whether the user input unit 230 is manipulated or the display device 100 is controlled through the output unit 250.

For example, the output unit 250 can include an LED module 251 for flashing, a vibration module 253 for generating vibration, a sound output module 255 for outputting sound, or a display module 257 for outputting an image, if the user input unit 230 is manipulated or signals are transmitted/received to/from the display device 100 through the wireless communication unit 220.

Additionally, the power supply unit 260 supplies power to the remote control device 200 and if the remote control device 200 does not move for a predetermined time, stops the power supply, so that power waste can be reduced. The power supply unit 260 can resume the power supply if a predetermined key provided at the remote control device 200 is manipulated.

The storage unit 270 can store various kinds of programs and application data necessary for control or operation of the remote control device 200. If the remote control device 200 transmits/receives signals wirelessly through the display device 100 and the RF module 221, the remote control device 200 and the display device 100 transmits/receives signals through a predetermined frequency band.

The control unit 280 of the remote control device 200 can store, in the storage unit 270, information on a frequency band for transmitting/receiving signals to/from the display device 100 paired with the remote control device 200 and refer to it.

The control unit 280 controls general matters relating to control of the remote control device 200. The control unit 280 can transmit a signal corresponding to a predetermined key manipulation of the user input unit 230 or a signal corresponding to movement of the remote control device 200 sensed by the sensor unit 240 to the display device 100 through the wireless communication unit 220.

Additionally, the sound acquisition unit 290 of the remote control device 200 can obtain voice. The sound acquisition unit 290 can include at least one microphone and obtain voice through the microphone 291.

Figure 4:
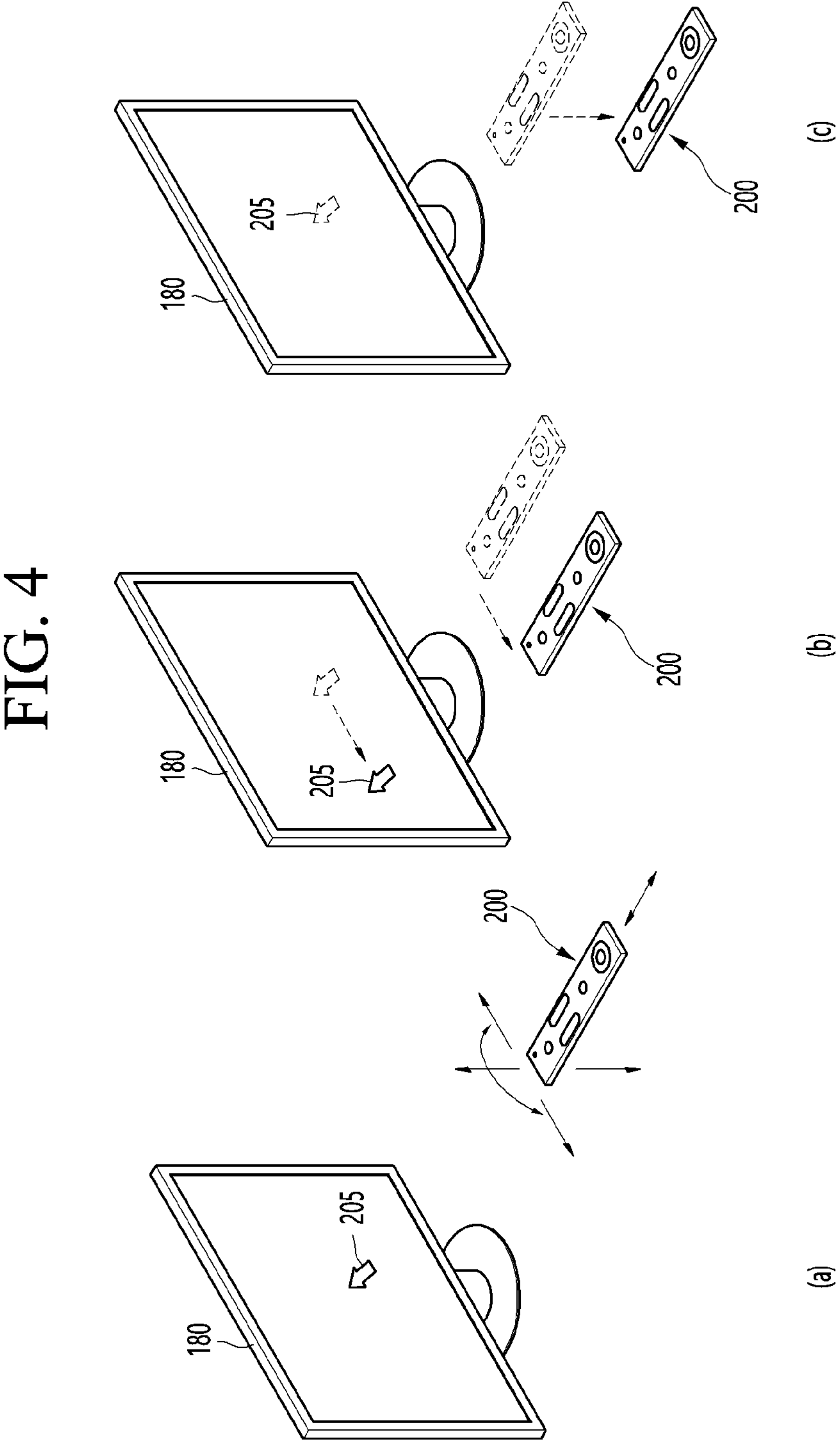
FIG. 4 is a view of utilizing a remote control device according to an embodiment of the present invention.

FIG. 4 is a view of utilizing a remote control device according to an embodiment of the present invention. FIG. 4(*a*) illustrates that a pointer 205 corresponding to the remote control device 200 is displayed on the display unit 180.

A user can move or rotate the remote control device 200 vertically or horizontally. The pointer 205 displayed on the display unit 180 of the display device 100 corresponds to a movement of the remote control device 200. Since the corresponding pointer 205 is moved and displayed according to a movement on a 3D space as show in the drawing, the remote control device 200 can be referred to as a spatial remote control device.

FIG. 4(*b*) illustrates that if a user moves the remote control device 200, the pointer 205 displayed on the display unit 180 of the display device 100 is moved to the left according to the movement of the remote control device 200.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4(*c*) illustrates that while a specific button in the remote control device 200 is pressed, a user moves the remote control device 200 away from the display unit 180.

Thus, a selection area in the display unit 180 corresponding to the pointer 205 can be zoomed in and displayed larger.

On the other hand, if a user moves the remote control device 200 close to the display unit 180, a selection area in the display unit 180 corresponding to the pointer 205 can be zoomed out and displayed in a reduced size.

On the other hand, if the remote control device 200 is moved away from the display unit 180, a selection area can be zoomed out and if the remote control device 200 is moved closer to the display unit 180, a selection area can be zoomed in.

Additionally, if a specific button in the remote control device 200 is pressed, recognition of a vertical or horizontal movement can be excluded. That is, if the remote control device 200 is moved away from or closer to the display unit 180, the up, down, left, or right movement cannot be recognized and only the back and forth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display unit 180 in response to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display unit 180 and also can be displayed in correspondence to a plurality of points such as a line and a surface.

Figure 5:
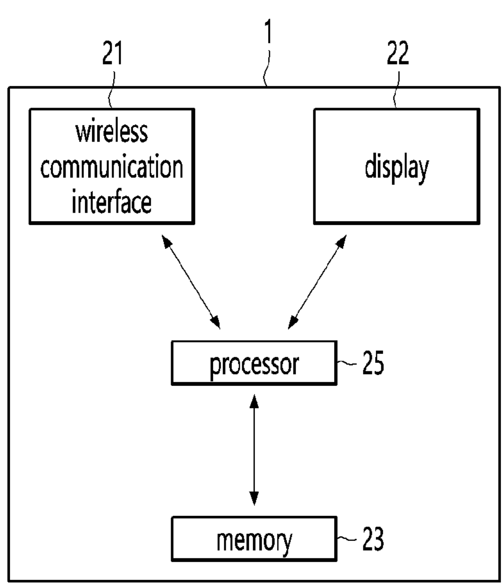
FIG. 5 is a diagram for explaining the configuration of a wireless device according to an embodiment of the present disclosure.

FIG. 5 is a diagram for explaining the configuration of a wireless device according to an embodiment of the present disclosure.

The wireless device 1 described below may be any one of a TV, a smart phone, a tablet PC, a navigation device, a wearable device, a wireless keyboard, a wireless headset, and a sound bar.

Referring to FIG. 5, the wireless device 1 may include a wireless communication interface 21, a display 22, a memory 23 and a processor 25.

The wireless communication interface 21 may transmit/receive a wireless signal, and may implement a physical layer according to the IEEE 802 system, for example. The wireless communication interface 21 may be referred to as a transceiver.

The wireless communication interface 21 may perform communication with an external device through wireless communication. The wireless communication interface 21 may perform short range communication with an external device.

To this end, the wireless communication interface 21 includes Bluetooth™, Wireless Frequency Identification (RFID), Infrared Data Association (IrDA), Ultra Wideband (UWB), ZigBee, Near Field Communication (NFC), Wi-Short-distance communication may be supported using at least one of Fi (Wireless-Fidelity), Wi-Fi Direct, and Wireless USB (Wireless Universal Serial Bus) technologies.

The display 22 may convert the image signal, data signal, OSD signal processed by the processor 25, or the image signal or data signal received from the wireless communication interface 21 into R, G, and B signals, respectively, and generate driving signal.

The processor 25 may control operation of the wireless communication interface 21, the memory 23, and the display unit 22.

The processor 25 may be electrically connected to the wireless communication interface 21 to implement a physical layer and/or a MAC layer according to the IEEE 802 system.

In addition, the processor 25 may be configured to perform encoding and decoding operations of audio/video for WFD (Wi-Fi Direct) service.

The memory 23 may be included inside the processor 25 or may be installed outside the processor 25 and connected to the processor 25 by known means. Although not shown, the wireless device 1 may further include a sound output unit for outputting sound.

Figure 6:
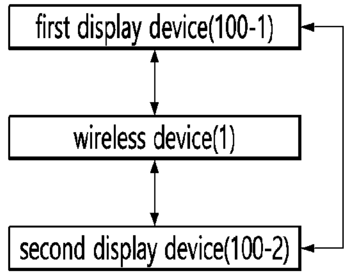
FIG. 6 is a diagram for explaining the configuration of a wireless system according to an embodiment of the present disclosure.

FIG. 6 is a diagram for explaining the configuration of a wireless system according to an embodiment of the present disclosure.

Referring to FIG. 6, a wireless system according to an embodiment of the present disclosure may include a first display device 100-1, a second display device 100-2, and a wireless device 1.

The wireless device 1 and the first display device 100-1 may be in a Bluetooth pairing and connection state.

Bluetooth pairing may be a process of establishing a connection step before transmitting video data or audio data. However, it is not necessarily limited thereto, and pairing may include a concept of connection.

The Bluetooth connection may be in a state in which image data or audio data may be transmitted after pairing.

The first display device 100-1 may disconnect the Bluetooth connection with the wireless device 1 according to the device switching request and transmit first Bluetooth information to the second display device 100-2.

The wireless device 1 may perform Bluetooth pairing and connection with the second display device 100-1 based on the received first Bluetooth information.

Next, referring to FIG. 7, an operating method of a system according to an embodiment of the present invention will be described.

Figure 7:
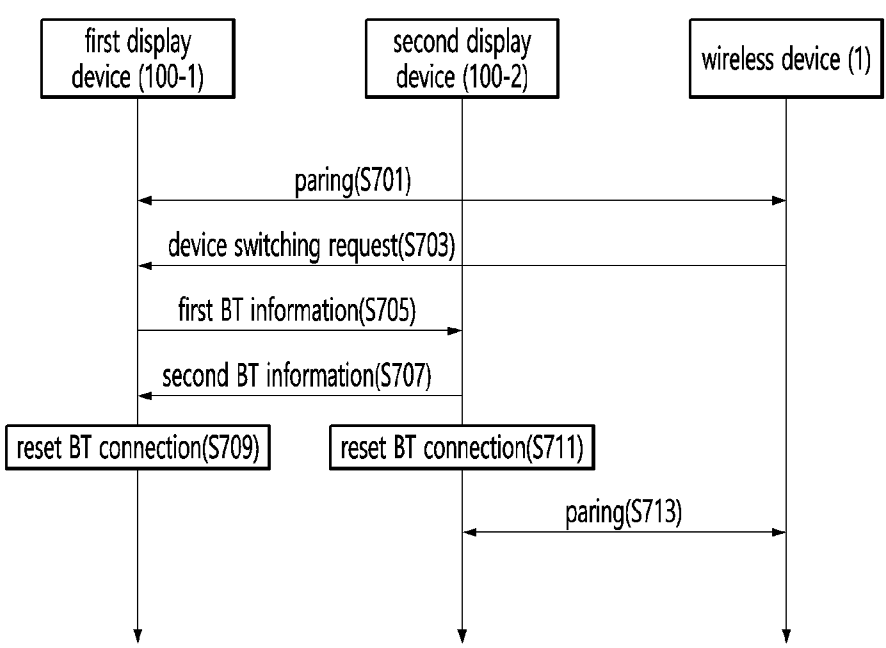
FIG. 7 is a ladder diagram for a method of operating a system according to an embodiment of the present invention.

FIG. 7 is a ladder diagram for a method of operating a system according to an embodiment of the present invention.

Referring to FIG. 7, the first display device 100-1 and the wireless device 1 are paired through Bluetooth communication (S701).

The first display device 100-1 may be paired with the wireless device 1 through Bluetooth communication to receive or transmit one or more of image data or audio data from the wireless device 1.

The first display device 100-1 may be in a paired state with other wireless devices other than the wireless device 1.

The processor 25 of the wireless device 1 may transmit a device switching request for switching a pairing target device to the wireless communication unit 173 of the first display device 100-1 through the wireless communication interface 21 (S703).

The controller 170 of the first display device 100-1 may receive a device switching request requesting pairing with the second display device 100-2 from the wireless device 1.

In another embodiment, the controller 170 of the first display device 100-1 may receive a device switching request for requesting pairing between the first display device 100-1 and the second display device 100-2 from the remote control device 200.

The controller 170 of the first display device 100-1 may receive an input of a device to perform Bluetooth pairing with the wireless device 1 through the user interface screen.

This will be described with reference to the following drawing.

Figure 8:
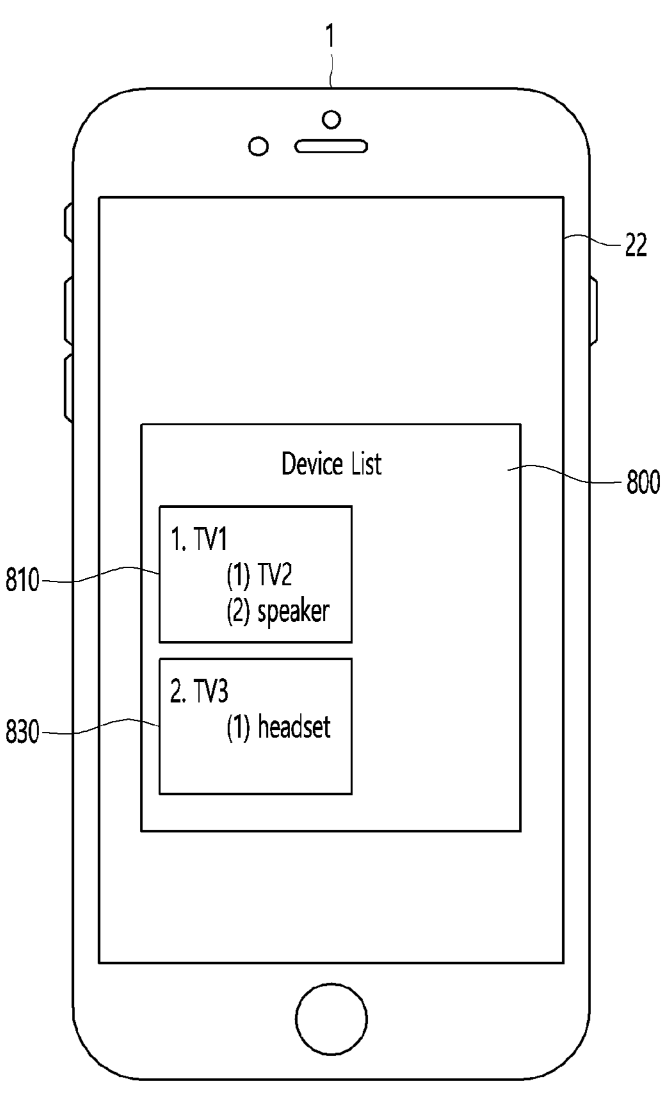
FIG. 8 is a diagram illustrating a process of selecting a device to switch Bluetooth pairing through an interface screen displayed on a wireless device according to an embodiment of the present disclosure.

FIG. 8 is a diagram illustrating a process of selecting a device to switch Bluetooth pairing through an interface screen displayed on a wireless device according to an embodiment of the present disclosure.

In FIG. 8, it is assumed that the wireless device 1 is a mobile phone, TV1 is the first display device 100-1, and TV2 is the second display device 100-2.

Referring to FIG. 8, the processor 25 of the wireless device 1 may display on the display 22 a device list 800 that are Bluetooth-paired or have been Bluetooth-paired with the wireless device 1.

The device list 800 may include information 810 on devices paired with the wireless device 1 via Bluetooth and information 830 on paired devices.

The device list 800 may be a menu screen for selecting a device to be paired with the wireless device 1 via Bluetooth.

The device list 800 may be generated based on information received from each of TV1 and TV3.

The device list 800 may include a first item 810 and a second item 830.

The first item 810 may include TV1 currently Bluetooth-paired with the wireless device 1 and device information possessed by the TV1.

The information possessed by TV1 may include information of devices that have been connected to TV1 via Bluetooth or are currently being connected. For example, information possessed by TV1 may include Bluetooth information of TV2 and Bluetooth information of a speaker.

Bluetooth information of TV2 may include one or more of a MAC address of TV2, a device name of TV2, and a link key.

The link key may be an encrypted key generated during a Bluetooth pairing process between two devices. A link key can be used to secure a transaction of data through Bluetooth communication between two devices.

The speaker's Bluetooth information may include one or more of the speaker's MAC address, speaker's device name, and link key.

The second item 830 may include TV3 that was Bluetooth-paired with the wireless device 1 in the past and device information possessed by the TV3. For example, information possessed by TV3 may include Bluetooth information of the headset.

The speaker's Bluetooth information may include one or more of the speaker's MAC address, speaker's device name, and link key.

The user can select a device to switch a Bluetooth connection with himself through the device list 800 of the wireless device 1.

The wireless device 1 may receive a user input for selecting TV3 included in the first item 810. The wireless device 1 may obtain a user input for selecting TV3 as a device switching request.

The wireless device 1 may transmit a device switching request for switching Bluetooth pairing to TV3 to the first display device 100-1.

The first display device 100-1 may transmit first Bluetooth information to the second display device 100-2 serving as TV3 in response to the device switching request.

Figure 9:
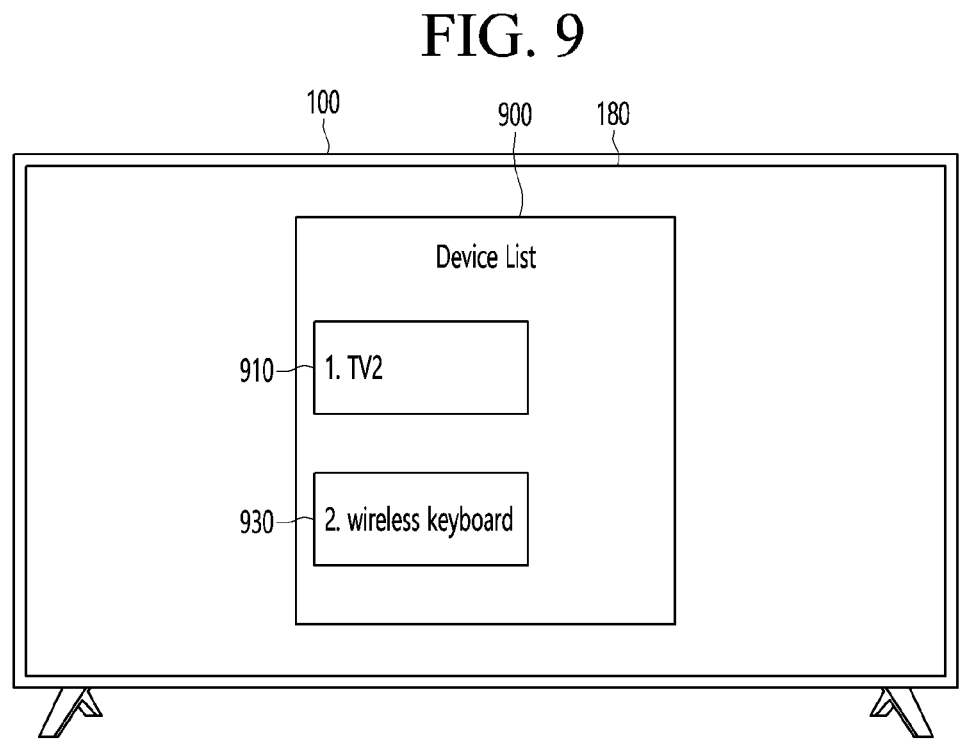

FIG. 9 is a diagram illustrating a process of selecting a device to switch Bluetooth pairing through an interface screen displayed on a first display device according to another embodiment of the present disclosure.

In FIG. 8, it is assumed that the wireless device 1 is a mobile phone, TV1 is the first display device 100-1, and TV2 is the second display device 100-2.

The first display device 100-1 may receive a device switching request through the wireless device 1 or the remote control device 200.

As shown in FIG. 9 according to the received device switching request, the first display device 100-1 may display list 900 including information about devices currently connected to the first display device 100-1 through Bluetooth communication on the display unit 180.

The device list 900 may include a first device item 910 corresponding to TV2 and a second device item 930 corresponding to a wireless keyboard.

The first display device 100-1 may receive a request to select the first device item 910 from the wireless device 1 or the remote control device 200.

The first display device 100-1 may obtain a request for selecting the first device item 910 as a device switching request.

Again, FIG. 7 will be described.

The controller 170 of the first display device 100-1 transmits a first Bluetooth information to the second display device 100-2 according to the received device switching request (S705), and in response to transmitting first Bluetooth information to the second display device 100-2, receive a second Bluetooth information from the second display device 100-2 (S707).

That is, according to the device switching request, the first display device 100-1 and the second display device 100-2 may exchange Bluetooth information with each other.

The first Bluetooth information may include at least one of the MAC address of the first display device 100-1, the name (or model name) of the first display device 100-1, a link key for security during Bluetooth communication with the wireless device 1, identification information of the wireless device 1 that has transmitted the device switching request.

The identification information of the wireless device 1 may include one or more of a name (or model name) of the wireless device 1 and a MAC address of the wireless device 1.

The second Bluetooth information may include at least one of the MAC address of the second display device 100-2, the name (or model name) of the second display device 100-2, and a link key for security during Bluetooth communication with another wireless device.

Figure 10:
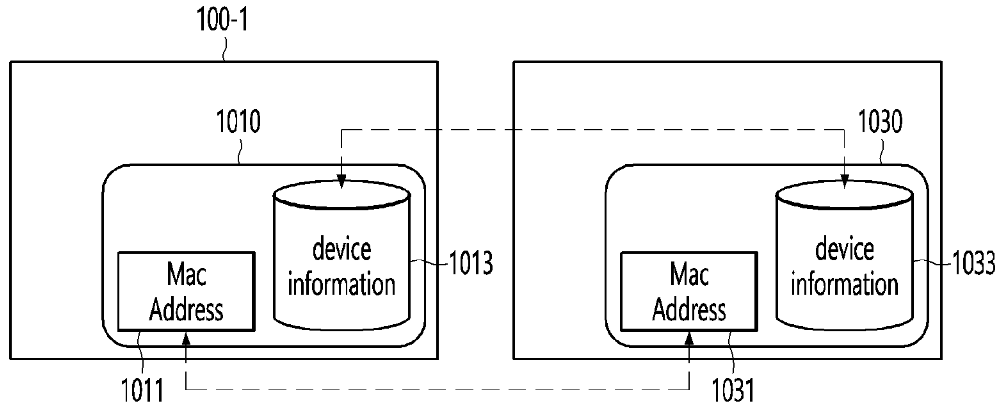
FIG. 10 is a diagram for explaining an example of exchanging Bluetooth information between a first display device and a second display device according to an embodiment of the present disclosure.

FIG. 10 is a diagram for explaining an example of exchanging Bluetooth information between a first display device and a second display device according to an embodiment of the present disclosure.

Referring to FIG. 10, the first display device 100-1 may store a first Bluetooth information 1010 in the storage 140, and the second display device 100-2 may store a second Bluetooth information 1030 in the storage unit 140.

The first Bluetooth information 1010 may include a first MAC address 1011 indicating a unique address assigned to the first display device 100-1 for Bluetooth communication and first device information 1013. The first device information 1013 may include one or more of the name, model name, and link key of the first display device 100-1.

The second Bluetooth information 1030 may include a second MAC address 1031 indicating a unique address assigned to the second display device 100-2 for Bluetooth communication and second device information 1033. The second device information 1033 may include one or more of the name, model name, and link key of the second display device 100-2.

The first display device 100-1 may transmit its first MAC address 1011 to the second display device 100-2, and the second display device 100-2 may store the received first MAC address separately for the purpose of Bluetooth pairing with the wireless device 1.

In addition, the first display device 100-1 may transmits a link key used for secure transaction to the second display device 100-2 during data communication with the wireless device 1, and the second display device 100-2 may separately store the received link key for data communication with the wireless device 1.

The exchange of the first Bluetooth information and the second Bluetooth information can be confirmed through a menu displaying hardware information of the device. That is, if, on the menu, the MAC address of the second display device 100-2 is changed to the MAC address of the first display device 100-1, and the MAC address of the first display device 100-1 is changed to the MAC address of the second display device 100-2, it can be seen that the Bluetooth information of each other has been switched.

Again, FIG. 7 will be described.

After exchanging Bluetooth information, the first display device 100-1 and the second display device 100-2 reset their Bluetooth connection (S709 and 711).

That is, the first display device 100-1 may disconnect the Bluetooth connection with the wireless device 1. After that, the first display device 100 may wait for a Bluetooth connection with another device.

Similarly, the second display device 100-2 may also disconnect itself from a Bluetooth-connected device.

The wireless device 1 performs pairing with the second display device 100-2 through Bluetooth communication based on the first Bluetooth information (S713).

Since the first display device 100-1 has disconnected from the wireless device 1 by the device switching request, it may not transmit a response message to the pairing request of the wireless device 1.

The second display device 100-2 may transmit first Bluetooth information to the wireless device 1 in response to the pairing request received from the wireless device 1.

The wireless device 1 may perform pairing with the second display device 100-2 based on the first Bluetooth information. The wireless device 1 may recognize the second display device 100-2 transmitting the first Bluetooth information as the first display device 100-1.

Specifically, the wireless device 1 may be paired with the second display device 100-2 using the first MAC address 1011 of the first display device 100-1 included in the first Bluetooth information.

Then, the wireless device 1 may perform data communication with the second display device 100-2 by using the link key included in the first Bluetooth information.

If the second display device 100-2 and the wireless device 1 have never performed a Bluetooth connection with each other, There is discomfort that the user must go through a Bluetooth registration and connection procedure between the second display device 100-2 and the wireless device 1.

However, according to an embodiment of the present disclosure, the second display device 100-2 already has the first Bluetooth information of the first display device 100-2 according to the device switching request, and through the first Bluetooth information Bluetooth pairing can be performed without a registration process with the wireless device 1.

Accordingly, the user has the convenience of performing a Bluetooth connection with a new device without a complicated process.

Figure 11:
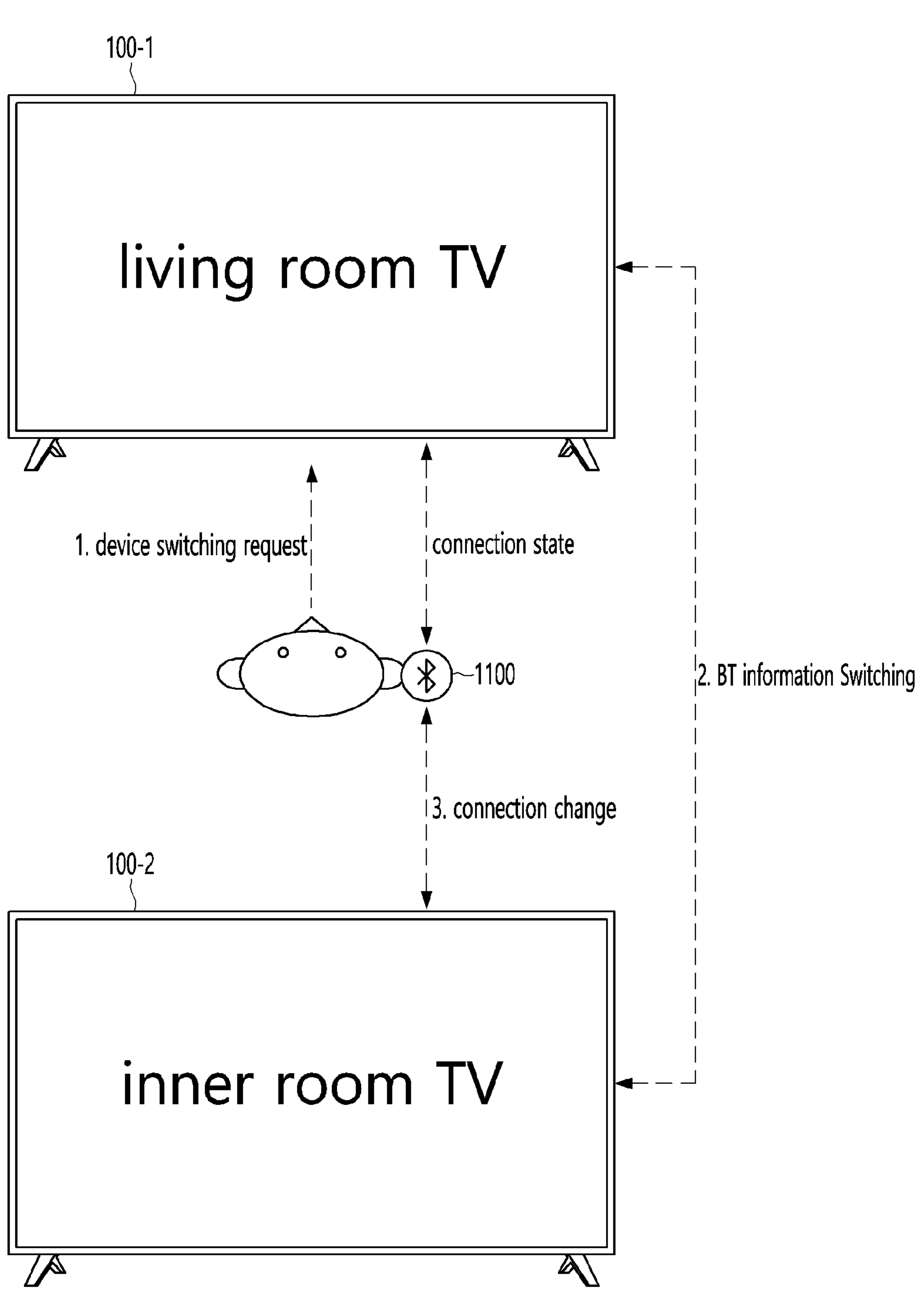
FIG. 11 is a diagram illustrating a scenario of a device switching process according to an embodiment of the present disclosure.

FIG. 11 is a diagram illustrating a scenario of a device switching process according to an embodiment of the present disclosure.

In FIG. 11, it assumed that the first display device 100-1 is a living room TV located in the living room, the second display device 100-2 is an inner room TV located in the inner room, and the wireless device is a wireless headset 1100 worn by a user.

After the living room TV 100-1 and the wireless headset 1100 are paired through Bluetooth communication, they are in a connected state.

The user is watching an image through the living room TV 100-1, and the wireless headset 1100 wirelessly receives audio data from the living room TV 100-1.

The living room TV 100-1 may transmit a device switching request to the living room TV 100-1. The device switching request may be a request for switching a Bluetooth connection target device from the living room TV 100-1 to the inner room TV 100-2.

The living room TV 100-1 may transmit Bluetooth information of the living room TV 100-1 to the inner room TV 100-2 according to the received device switching request.

The Bluetooth information of the living room TV 100-1 may include one or more of the MAC addresses of the MAC address assigned to the living room TV 100-1, the link key used for secure transaction between the living room TV 100-1 and the wireless headset 1100, and the wireless headset 1100.

The inner TV 100-2 may perform Bluetooth pairing with the wireless headset 1100 using the received Bluetooth information. The inner room TV 100-2 may perform pairing with the wireless headset 1100 using the MAC address of the living room TV 100-1 included in the received Bluetooth information.

The wireless headset 1100 may receive the MAC address of the living room TV 100-1 from the inner room TV 100-2 and recognize the inner room TV 100-2 as the living room TV 100-1 through this.

The wireless headset 1100 may perform Bluetooth pairing with the inner room TV 100-2 and perform data communication through a link key.

In this way, the user can easily attempt Bluetooth connection of the inner room TV 100-2 to the wireless headset 1100 only by requesting device switching without a procedure for registering the inner room TV 100-2 separately.

Next, FIG. 12 will be described.

Figure 12:
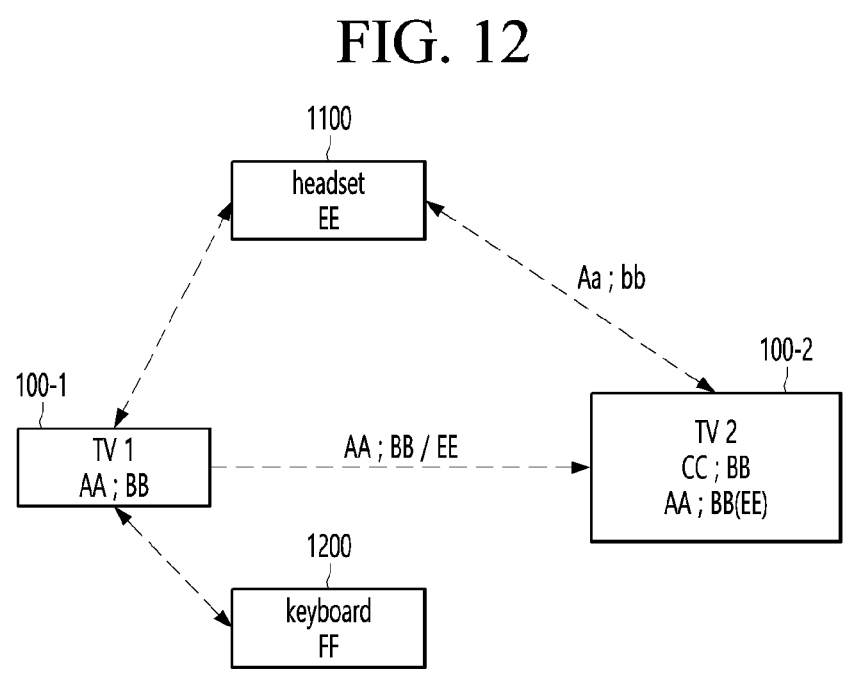

FIG. 12 is a diagram illustrating a process of switching a connection between devices according to a device switching request if a plurality of wireless devices are connected to a first display device through Bluetooth, according to an embodiment of the present disclosure.

In FIG. 12, it is assumed that the first display device 100-1 is paired with the wireless headset 1100 and the wireless keyboard 1200 and connected to Bluetooth.

The first display device 100-1 may receive a device switching request for switching the Bluetooth connection to the second display device 100-2 from the wireless headset 1100.

The first display device 100-1 may transmit the MAC address (AA;BB) of the first display device 100-1 and the MAC address (EE) of the wireless headset 1100 to the second display device 100-2.

The first display device 100-1 recognizes that the device switching request includes information related to the selection of the second display device 100-2, and may not transmit the MAC address (FF) of the wireless keyboard 1200 to the second display device 100-2.

For pairing with the wireless headset 1100, the second display device 100-2 may separately store the received MAC address (AA;BB) of the first display device 100-1 to its own MAC address (CC;BB).

The second display device 100-2 may recognize the MAC address (AA;BB) of the first display device 100-1 for a Bluetooth connection with the wireless headset 1100.

The second display device 100-2 may recognize that the MAC address (AA;BB) of the first display device (100-1) is used for Bluetooth connection with a device to which the MAC address (EE) is assigned through the MAC address (EE) of the wireless headset 1100 received together with the MAC address (AA;BB) of the first display device 100-1.

The wireless headset 1100 disconnects from the first display device 100-1, and the first display device 100-1 does not respond to the pairing request of the wireless headset 1100.

The second display device 100-2 may recognize the MAC address (AA;BB) of the first display device 100-1 as its own unique address, and transmit the MAC address (AA;BB) of the first display device 100-1 to the wireless headset 1100.

The wireless headset 1100 may perform Bluetooth pairing by recognizing the second display device 100-2 as the first display device 100-1 based on the MAC address (AA;BB) of the first display device 100-1 received from the second display device 100-2.

That is, the wireless headset 1100 can be directly connected to the second display device 100-2 without a registration process for connection with the second display device 100-2.

Meanwhile, since device information exchanged between the wireless keyboard 1200 previously connected to the first display device 100-1 coincides with each other, the connection is maintained.

As described above, according to an embodiment of the present disclosure, in a state in which a plurality of devices are Bluetooth-connected to the first display device 100-1, the first display device 100-1 may disconnect wireless headset 1100, and the does not disconnect connection of the wireless keyboard 1200.

That is, the first display device 100-1 can maintain a Bluetooth connection with the wireless keyboard 1200, and the wireless headset 1100 can perform a Bluetooth connection with the second display device 100-2.

The wireless headset 1100 recognizes the second display device 100-2 as the first display device 100-1, and without a device registration process of the second display device 100-2, Bluetooth connection can be made with the second display device 100-2.

According to an embodiment of the present disclosure, the above-described method can be implemented as a processor-readable code in a medium on which a program is recorded. Examples of media readable by the processor include ROM, RAM, CD-ROM, magnetic tape, floppy disk, and optical data storage devices, and those implemented in the form of carrier waves (e.g., transmission through the Internet) may be included.

The display device described above is not limited to the configuration and method of the above-described embodiments, but the embodiments may be configured by selectively combining all or part of each embodiment so that various modifications can be made.

The invention claimed is:

1. A display device comprising:

a display;

a wireless communication interface configured to perform Bluetooth communication with a plurality of wireless devices; and a control unit configured to:

maintain Bluetooth connections with a first wireless device and a second wireless device;

receive a device switching request associated with the first wireless device;

transmit Bluetooth connection information of the display device to a second display device according to the device switching request; and disconnect the Bluetooth connection with the first wireless device while maintaining the Bluetooth connection with the second wireless device, such that the first wireless device establishes a Bluetooth connection with the second display device without performing a pairing registration with the second display device.

2. The display device of claim 1, wherein the Bluetooth connection information comprises authentication information previously established between the display device and the first wireless device.

3. The display device of claim 1, wherein the device switching request is received through a user interface screen displayed on the display.

4. The display device of claim 1, wherein the device switching request is received through a user interface screen displayed on the display.

5. The display device of claim 1, wherein the second wireless device remains Bluetooth-connected to the display device during execution of the device switching request.

6. The display device of claim 1, wherein the first wireless device establishes the Bluetooth connection with the second display device based on the Bluetooth connection information previously used with the display device.

7. A system comprising:

a first wireless device;

a second wireless device; and a display device configured to support Bluetooth communication, wherein the display device is configured to:

maintain a first Bluetooth connection with the first wireless device and a second Bluetooth connection with the second wireless device concurrently;

receive a device switching request associated with the first wireless device;

in response to the device switching request, terminate the first Bluetooth connection associated with the first wireless device; and maintain the second Bluetooth connection associated with the second wireless device during execution of the device switching request.

8. The system of claim 7, wherein the first wireless device and the second wireless device are Bluetooth-connected to the display device prior to receipt of the device switching request.

9. The system of claim 7, wherein the device switching request is generated based on a user selection of the first wireless device from a list of wireless devices currently connected to the display device.

10. The system of claim 7, wherein the first wireless device establishes a Bluetooth connection with another display device without performing a new device registration process, based on termination of the first Bluetooth connection.

11. The system of claim 7, wherein the display device does not alter a Bluetooth identity or address of the display device during execution of the device switching request.

12. The system of claim 7, wherein the second wireless device remains continuously usable while the first wireless device is being switched to another display device.

13. The system of claim 7, wherein termination of the first Bluetooth connection is performed after receipt of the device switching request and prior to establishment of a Bluetooth connection between the first wireless device and another display device.

* * * * *